United States Patent
Oelke et al.

(10) Patent No.: US 9,789,979 B2
(45) Date of Patent: Oct. 17, 2017

(54) FLIGHT TEST HINGE ASSEMBLY CONFIGURED FOR CALCULATING EXERTED FORCES THROUGH STRAIN ANALYSIS

(71) Applicant: THE BOEING COMPANY, Chicago, IL (US)

(72) Inventors: Brian S. Oelke, Seattle, WA (US); James A. Williams, Snohomish, WA (US); Robert Johnson, Issaquah, WA (US); Shahzad Aminzadeh, Mill Creek, WA (US); Matt R. Dickerson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 517 days.

(21) Appl. No.: 14/329,199

(22) Filed: Jul. 11, 2014

(65) Prior Publication Data
US 2016/0185468 A1    Jun. 30, 2016

(51) Int. Cl.
*B64F 5/60* (2017.01)
*B64F 5/00* (2017.01)
(Continued)

(52) U.S. Cl.
CPC .............. *B64F 5/0045* (2013.01); *B64C 9/02* (2013.01); *B64F 5/60* (2017.01); *G01L 5/00* (2013.01); *G01L 5/161* (2013.01)

(58) Field of Classification Search
CPC . B64C 25/00; B64C 25/001; B64C 2025/006; Y02T 50/53; B64D 45/0005; B64D 2045/008; B64F 5/0045; G01L 5/00; G01L 1/22; G01L 5/16; G01L 1/2243; G01L 5/161; G01L 1/142; G01L 5/0014; G01L 1/20

USPC ...... 73/862.381, 862.041, 862.045, 862.628, 73/782, 862.04, 146, 862.044, 862.65; 702/42

See application file for complete search history.

(56) References Cited

U.S. PATENT DOCUMENTS

2012/0095702 A1* 4/2012 Baird ................... B64C 25/00
702/42

FOREIGN PATENT DOCUMENTS

| EP | 2441677 | 4/2012 | |
| SU | 537267 | * 11/1976 | ............... G01L 1/22 |

OTHER PUBLICATIONS

Extended European Search Report for EP 15174392.9-1557, dated Nov. 20, 2015.
English translation of SU 537267.

* cited by examiner

*Primary Examiner* — Lisa Caputo
*Assistant Examiner* — Brandi Hopkins
(74) *Attorney, Agent, or Firm* — Joseph M. Butscher; The Small Patent Law Group, LLC

(57) ABSTRACT

A system for calculating forces exerted into an aircraft component includes a test hinge assembly and a monitoring system. In at least one embodiment, the test hinge assembly is a triangular shaped assembly, and includes at least one beam, at least one connecting joint having a channel configured to receive and retain a fastening member, and at least one strain gage secured to an outer surface of the beam(s). The strain gage(s) is configured to detect one or more strains exerted into the beam(s). The monitoring system is in communication with the strain gage(s). The monitoring system is configured to calculate forces exerted into the fastening member(s) by analyzing the strain(s) exerted into the beam(s).

18 Claims, 3 Drawing Sheets

(51) Int. Cl.
  *G01L 5/00* (2006.01)
  *G01L 5/16* (2006.01)
  *B64C 9/02* (2006.01)

FLIGHT TEST HINGE ASSEMBLY CONFIGURED FOR CALCULATING EXERTED FORCES THROUGH STRAIN ANALYSIS

BACKGROUND OF THE DISCLOSURE

Embodiments of the present disclosure generally relate to test hinge assemblies, and, more particularly, to test hinge assemblies used to test components of an aircraft.

During development of aircraft, structural loads exerted into and on various components, such as flight control surfaces, are monitored. For example, forces exerted onto various flight control surfaces (for example, ailerons, flaperons, elevators, rudders, and the like) may be monitored through the use of flight test hinges. The forces are monitored to determine aircraft safety and performance. The United States Federal Aviation Administration (FAA) typically requires that the various components meet or exceed particular thresholds. For example, in order to receive FAA certification, the structural loads within various flight control surfaces typically need to meet or exceed certain force thresholds.

A flight test hinge may include channels that retain pins or bolts. Strain gages or gauges are positioned on or within the pins or bolts. In particular, the strain gages are located inside of hollowed-out portions of pins or bolts. However, certain control surface hinges are often not large enough to form a channel through a bolt or pin in order to fit a strain gage therein. Accordingly, the component onto which the test hinge secures may be redesigned or retrofit to accommodate a larger pin or bolt. For example, in order to fit a test hinge to certain aircraft components, the test hinge and/or a portion of the aircraft itself may be expanded or buttressed so that a larger pin or bolt may be used. Further, the bolt or pin itself may be replaced with a stronger, more expensive replacement that may be cored or hollowed out in order to accommodate a strain gage, as the standard bolt or pin may be unable to withstand exerted forces after an internal chamber has been formed therein.

In order to retrofit or redesign a hinge pin or bolt, larger diameter structures are employed. The change in diameter may represent an extensive revision to already expensive production parts and assemblies. Notably, retrofitting of parts, components, and the like may reduce the accuracy of flight test structural load validation measurements.

As can be appreciated, redesigning control surfaces so that they may be tested may be a time and labor intensive process. As such, the costs of manufacturing and testing may increase. Moreover, by retrofitting components of an aircraft to accommodate a flight test hinge, the flight test data for the aircraft may not be completely accurate.

SUMMARY OF THE DISCLOSURE

Certain embodiments of the present disclosure provide a system for calculating forces exerted into an aircraft component. The system may include a test hinge assembly that may include at least one beam, at least one connecting joint on an end portion of the at least one beam having a channel configured to receive and retain a fastening member, and at least one strain gage secured to an outer surface of the at least one beam. The channel may be concentric with the fastening member. The strain gage(s) may be configured to detect one or more strains exerted into the beam(s). A monitoring system may be in communication with the strain gage(s). The monitoring system may be configured to calculate forces exerted into the fastening member(s) by analyzing the strain(s) exerted into the beam(s).

The beam(s) may include a cross beam connected to an extension beam through a first connecting joint, and a diagonal beam connected to the extension beam through a second connecting joint and connected to the cross beam through a third connecting joint. The strain gage(s) may include a first strain gage secured to the cross beam, and a second strain gage secured to the diagonal beam.

The forces may include a first pin load component force and a second pin load component force that is orthogonal to the first pin load component force. The first and second pin load component forces may emanate from, and/or be coincident with, a center of the fastening member.

The test hinge assembly may include at least one connecting joint configured to connect the test hinge assembly to a moveable portion of the aircraft component. In at least one embodiment, the test hinge assembly is shaped may be a right angle triangle. Alternatively, the test hinge assembly may be shaped as various other triangles.

The connecting joint(s) may include first, second, and third connecting joints. The test hinge assembly may be configured to direct a first force along a first straight force line from a first center of the first connecting joint to a second center of the third connecting joint. The test hinge assembly may be further configured to direct a second force along a second straight force line from a third center of the second connecting joint to the second center of the third connecting joint.

Certain embodiments of the present disclosure provide a test hinge assembly configured to detect one or more forces exerted into an aircraft component. The test hinge assembly may include at least one beam configured to be connected to one or both of a first and second portion of the aircraft component, at least one connecting joint having a channel configured to receive and retain a fastening member, and at least one strain gage secured to an outer surface of the at least one beam. The strain gage(s) is configured to detect one or more strains exerted into the beam(s).

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a test hinge assembly that provides a statically determinate design that allows strain gages to be positioned on external surfaces, as opposed to within internal, hollowed-out portions of pins or bolts. The test hinge assemblies may include three or more joints, each of which is configured to receive and retain a fastening member, such as a pin or bolt. The joints may be interconnected by connecting members, such as arms, legs, beams, trusses, brackets, or the like, that direct forces (for example, loads) through centerlines of the joints. One or more strain gages may be secured to outer surfaces of one or more of the connecting members. The strain gage(s) are configured to measure forces, such as strains, and therefore the load, exerted within one or more of the connecting members.

A monitoring system, such as a computer or computing device, may be in communication with the strain gage(s). The monitoring system may receive the detected strains to determine the loads within one or more of the fastening members secured to or within the test hinge assembly.

Each connecting member may be sized to generate a level of strain gage output based on expected loads. As such, the test hinge assembly may be tuned to provide increased accuracy of measured outputs.

The test hinge assembly may be calibrated prior to being installed on an aircraft component. For example, a known load may be applied to the test hinge assembly, and output(s) of the strain gage(s) may be detected. In this manner, the test hinge assembly may be calibrated.

Embodiments of the present disclosure provide a test hinge assembly that provides accurate flight control surface hinge load measurements. Also, the test hinge assembly may be quickly and easily secured to and removed from a component of an aircraft using standard tools and hardware (such as fastening pins or bolts).

Embodiments of the present disclosure provide a test hinge assembly that may eliminate the need for hinge joint redesign for larger pins or bolts. The test hinge assembly may be sized and shaped for particular applications.

Figure 1:
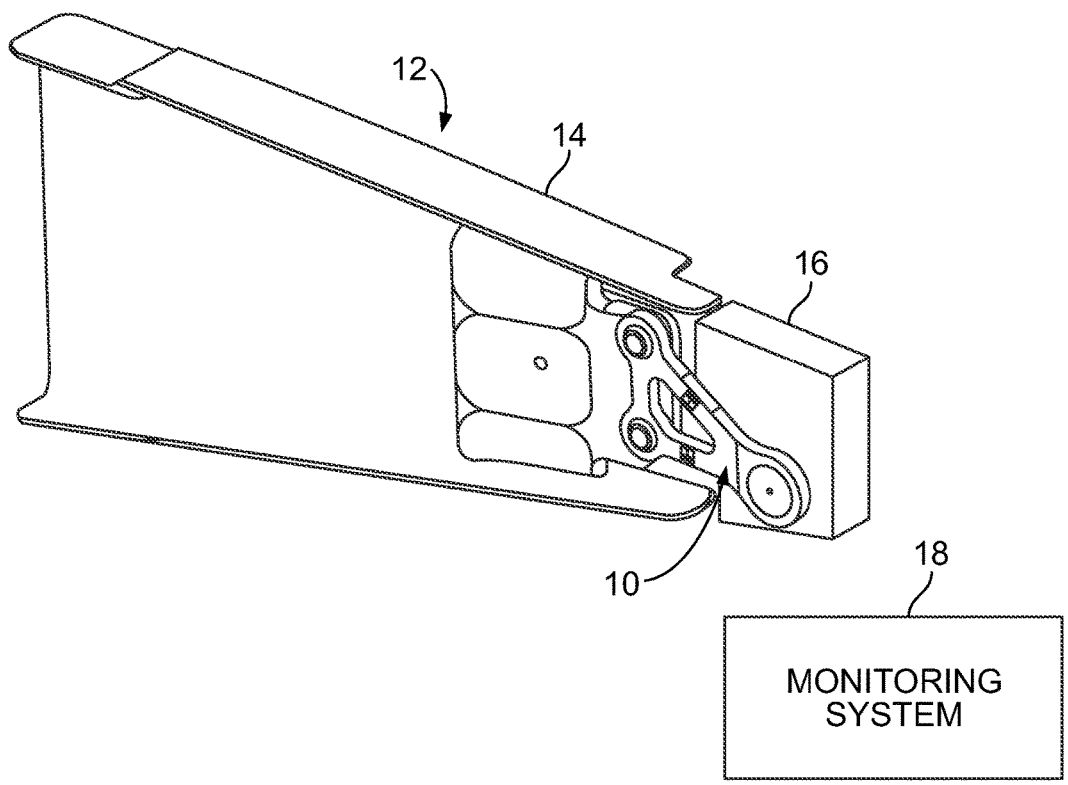
FIG. 1 illustrates a perspective view of a test hinge assembly secured to an aircraft component, according to an embodiment of the present disclosure.

FIG. 1 illustrates a perspective view of a test hinge assembly 10 secured to an aircraft component 12, according to an embodiment of the present disclosure. The aircraft component 12 may be or include a portion of a wing, for example, having a fixed portion 14 and a moveable portion, such as a hinged portion 16. The moveable portion may be a hinged portion, a pivotal portion, a rotatable portion, a sliding portion, a bending portion, and/or the like. The aircraft component 12 may be various other portions of an aircraft, such as a tail fin, stabilizer, or the like. The hinged portion 16 may be various components of an aircraft, such as an aileron, flaperon, elevator, rudder, or the like.

The test hinge assembly 10 may secure to the fixed portion 14 and the hinged portion 16 to determine forces exerted into or on the aircraft component 12 during flight tests. As described below, the test hinge assembly 10 includes one or more strain gages secured onto outer surfaces of connecting members, such as beams, trusses, brackets, or the like. The strain gage(s) are used to measure strain on the aircraft component 12.

One type of strain gage includes an insulating flexible backing that supports a metallic foil structure. Each strain gage may be secured to the test hinge assembly 10 through an adhesive, such as epoxy adhesives, cyanoacrylate, or the like, for example. As the aircraft component 12 or a portion thereof deforms, the electrical resistance of the strain gage(s) changes. Such a change, which may be measured using a Wheatstone bridge, for example, may relate to strain by a gage factor. The test hinge assembly 10 may employ various types of strain gages.

The strain gages(s) may be in communication with a monitoring system 18, such as through a wired or wireless connection. The monitoring system 18 may be configured to calculate forces (for example, pin load component forces) exerted into fastening members secured within the assembly 10, for example, by analyzing one or more strains exerted into the assembly 10, such as strains in cross beam 22 and diagonal beam 28. For example, the monitoring system 18 may receive and monitor strain data output by the strain gage(s) to determine the exerted forces, such as loads, on and/or in the pins or bolts securing the assembly 10 to the aircraft component 12. The monitoring system 18 may be located on or in the aircraft component 12 or another portion of the aircraft, for example. Optionally, the test hinge assembly 10 may include a memory that is in communication with the strain gage(s). The memory may record the strain data and may be communicatively coupled to the monitoring system 18 during or after the flight test.

The monitoring system 18 may include one or more control units, circuits, or the like, such as processing devices that may include one or more microprocessors, microcontrollers, integrated circuits, memory, such as read-only and/or random access memory, and the like. The monitoring system 18 may include any suitable computer-readable media used for data storage. For example, the monitoring system 18 may include computer-readable media. The computer-readable media are configured to store information that may be interpreted by the monitoring system 18. The information may be data or may take the form of computer-executable instructions, such as software applications, that cause a microprocessor or other such control unit within the monitoring system 18 to perform certain functions and/or computer-implemented methods. The computer-readable media may include computer storage media and communication media. The computer storage media may include volatile and non-volatile media, removable and non-removable media implemented in any method or technology for storage of information such as computer-readable instructions, data structures, program modules or other data. The memory and/or computer storage media may include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which may be used to store desired information and that may be accessed by components of the monitoring system 18.

Figure 2:
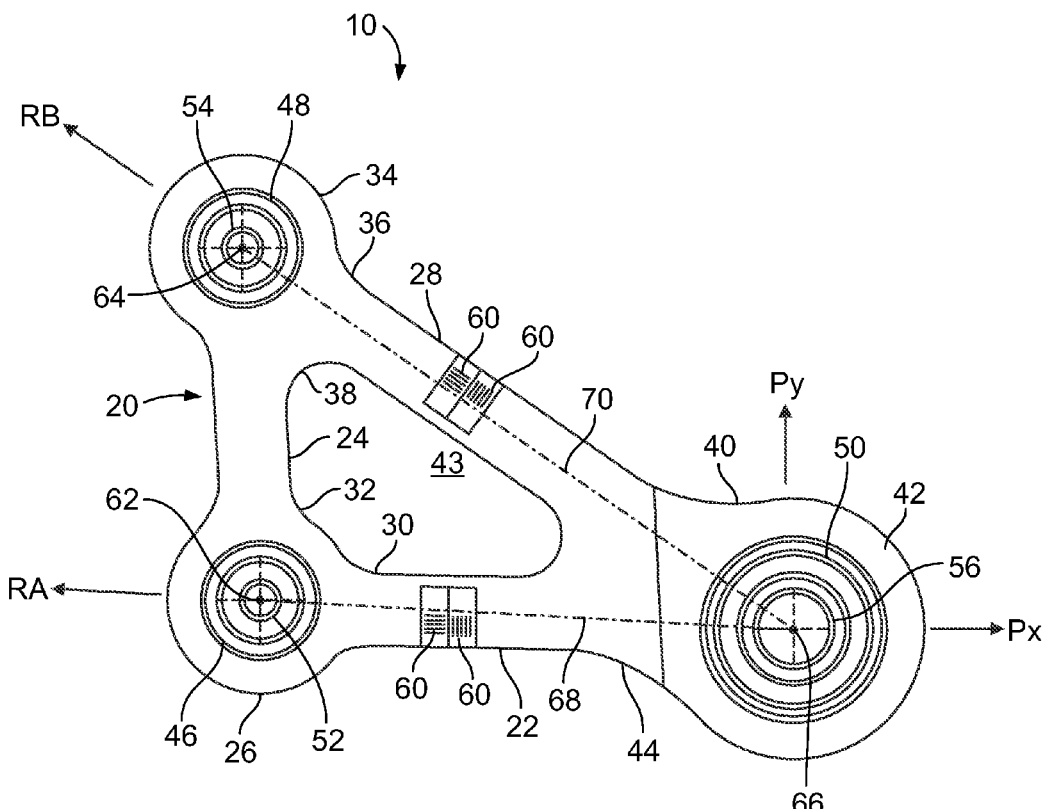
FIG. 2 illustrates a front view of a test hinge assembly, according to an embodiment of the present disclosure.

FIG. 2 illustrates a front view of the test hinge assembly 10, according to an embodiment of the present disclosure. The test hinge assembly 10 includes a main body 20 having a first connecting member, such as a cross beam 22, connected to a perpendicular second connecting member, such as an extension beam 24, through a first connecting joint 26 located at a first end 30 of the cross beam 22 and a first end 32 of the extension beam 24. A third connecting member, such as a diagonal beam 28, connects to a second connecting joint 34 located at a first end 36 of the diagonal beam 28 and a second end 38 of the extension beam 24. A second end 40 of the diagonal beam 28 connects to a third connecting joint 42 that connects the second end 40 of the diagonal beam 28 to a second end 44 of the cross beam 22. As shown, the main body 20 may form a right angle triangle with the cross beam 22 and the extension beam 24 forming first and second sides of the triangle, and the diagonal beam 28 forming the hypotenuse. Alternatively, instead of a 90 degree angle, the cross beam 22 may form an angle with the extension beam 24 at an angle that is greater or less than 90 degrees.

The triangular shape of the main body 20 includes an internal space 43. As such, the test hinge assembly 10 may be lighter and more responsive to exerted forces than a solid plate of material. Moreover, the sides of the triangular main body 20 direct forces along center lines between the centers of the connecting joints.

The main body 20 may be formed of a unitary piece of material, such as metal (for example, aluminum). The main body 20 may be integrally molded and formed as a single piece. Alternatively, the main body 20 may be formed having separate and distinct pieces that are joined together, such as through bonding, welding, or the like.

An internal space 43 may be defined between the cross beam 22, the extension beam 24, and the diagonal beam 28. Alternatively, structural material may span between the beams 22, 24, and 28.

Each of the cross beam 22, the extension beam 24, and the diagonal beam 28 may be planar beams having flat, planar outer surfaces. One or more strain gages 60 may be secured onto outer surfaces of the cross beam 22, the extension beam 24, and/or the diagonal beam 28. As shown in FIG. 2, strain gages 60 are secured onto outer surfaces of the cross beam 22 and the diagonal beam 28. Optionally, one or more strain gages 60 may be secured onto an outer surface of the extension beam 24. Further, more or less strain gages 60 may be used. For example, a single strain gage 60 may be secured onto an outer surface of the cross beam 22 and/or the diagonal beam 28.

The strain gages 60 may be positioned at any length of the cross beam 22, the extension beam 24, and/or the diagonal beam 28. As shown in FIG. 2, the strain gages 60 may be positioned at midpoints of the cross beam 22 and the diagonal beam 28. Alternatively, the strain gages 60 may be positioned closer to one end of beam than another.

The connecting joints 26, 34, and 42 include channels 46, 48, and 50, respectively, which are sized and shaped to receive and retain fastening members, such as pins 52, 54, and 56, respectively. The pins 52, 54, and 56 may be standard pins, bolts, screws, rivets, studs, or the like that are already used with an aircraft. The pins 52, 54, and 56 may be solid pins or bolts that are not cored or hollowed out.

The connecting joints 26, 34, and 42 may be sized and shaped so that the pins 52, 54, and 56 are secured within centers 62, 64, and 66, respectively, of the channels 46, 48, and 50. As such, the centers 62, 64, and 66 are concentric with the centers of the pins 52, 54, and 56, respectively, secured therein.

A straight force line 68 extends directly from the center 62 to the center 66 along the cross beam 22. A straight force line 70 extends directly from the center 64 to the center 66 along the diagonal beam 28. As such, the test hinge assembly 10 may be sized and shaped so that the force lines 68 and 70 are directed at the pin centers 62, 64, and 66. Forces are directed along the force line 68 from the pin center 62 to the pin center 66, or vice versa, Similarly, forces are directed along the force line 70 from the pin center 64 to the pin center 66, or vice versa.

Strain measurements detected by the strain gages 60 may be used to calculate pin loads $P_x$ and $P_y$ at the connecting joint 42, which may be a hinge joint that connects the test hinge assembly 10 to a moveable portion of an aircraft component. For example, referring to FIGS. 1 and 2, the connecting joints 26 and 34 may be secured to the fixed portion 14 of the aircraft component 12, while the connecting joint 42 may be secured to hinge portion 16 of the aircraft component 12. A determination of strains in the cross beam 22 and the diagonal beam 28 through the strain gages 60 provides a determination of forces RA and RB within the cross beam 22 and the diagonal beam 28, respectively.

Figure 3:
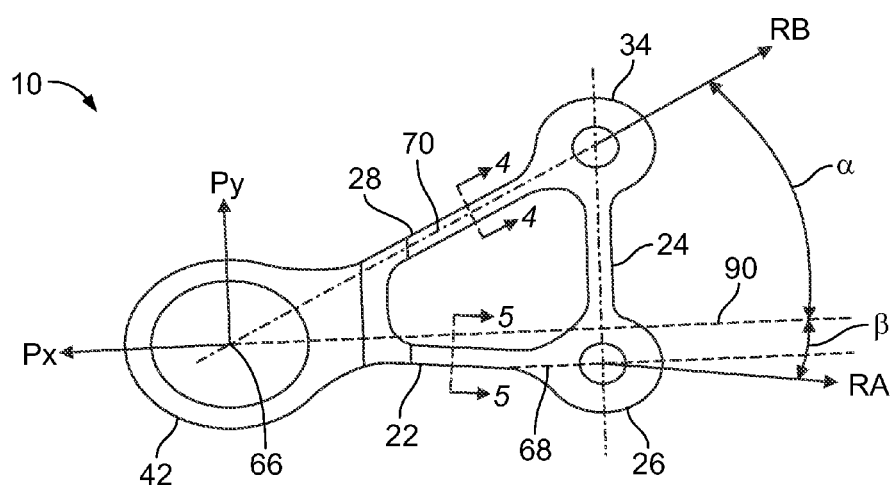
FIG. 3 illustrates a free body diagram of a test hinge assembly, according to an embodiment of the present disclosure.
Figure 4:
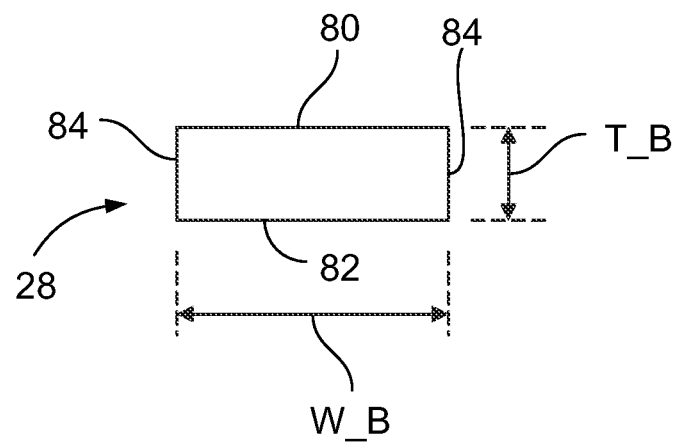
FIG. 4 illustrates a cross-sectional view of a diagonal beam through line 4-4 of FIG. 3, according to an embodiment of the present disclosure.
Figure 5:
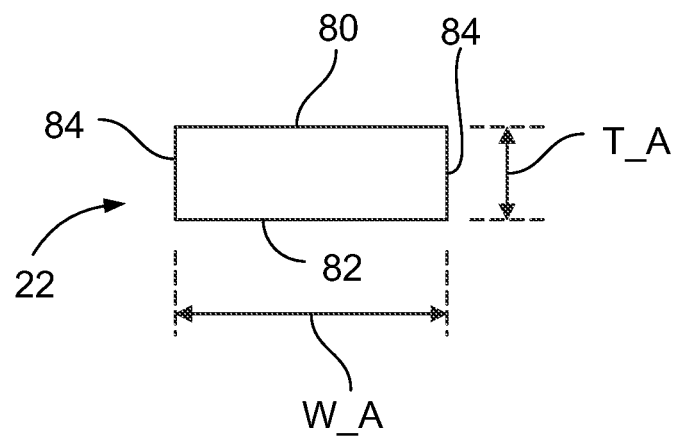
FIG. 5 illustrates a cross-sectional view of a cross beam through line 5-5 of FIG. 3, according to an embodiment of the present disclosure.

FIG. 3 illustrates a free body diagram of the test hinge assembly 10, according to an embodiment of the present disclosure. FIG. 4 illustrates a cross-sectional view of the diagonal beam 28 through line 4-4 of FIG. 3. FIG. 5 illustrates a cross-sectional view of the cross beam 22 through line 5-5 of FIG. 3. Referring to FIGS. 4 and 5, and as noted above, the diagonal beam 28 and the cross beam 22 may be planar beams having opposed flat upper and lower surfaces 80 and 82, respectively, connected to by perpendicular surfaces 84. As shown, the axial cross-section of each beam may be rectangular.

As noted above, the strain gages 60 (shown in FIG. 2) may be used to determine the strains exerted into the cross beam 22 and the diagonal beam 28. The monitoring system 18 (shown in FIG. 1) may receive strain data from the strain gages 60 to determine forces RA and RB, and the pin load components $P_X$ and $P_Y$ as follows:

$$RA = \epsilon A (T\_A \times W\_A) E \qquad \text{(Equation 1)}$$

where T_A is the thickness of the cross beam 22, W_A is the width of the cross beam 22, E is the modulus of elasticity, and ϵA is the strain in the section of the cross beam 22 at line 5-5 of FIG. 3.

$$RB = \epsilon B (T\_B \times W\_B) E \qquad \text{(Equation 2)}$$

where T_B is the thickness of the diagonal beam 28, W_B is the width of the diagnonal beam 28, E is the modulus of elasticity, and ϵB is the strain in the section of the diagonal beam 28 at line 4-4 of FIG. 3.

After RA and RB are determined, $P_X$ and $P_Y$ may then be calculated as follows:

$$P_X = RB \cos(\alpha) + RA \cos(\beta) \qquad \text{(Equation 3)}$$

$$P_Y = -(RB \sin(\alpha) - RA \sin(\beta)) \qquad \text{(Equation 4)}$$

where $P_X$ is the pin load component extending upwardly from the center 66, $P_Y$ is the pin load component extending horizontally outward from the center 66, α is the angle between the force line 70 and a horizontal line 90 extending from the center 66, and β is the angle between the line 90 and the force line 68. For example, α may be 31.74°, while β may be 7.34°.

As shown, the pin load components or vectors $P_X$ and $P_Y$ may extend from the center 66 of the connecting joint 44. As noted above, the pin that secures the connecting joint 44 to an aircraft component 12, such as a hinged portion 16, is centered about the center 66. That is, the center of the pin and the center 66 may be concentric. The pin load components or vectors $P_X$ and $P_Y$ may be coincident with (or emanate from) the center 66, such that $P_X$ is orthogonal to $P_Y$.

Accordingly, the strain gages 60 may be used to detect forces, such as strains, exerted into the cross beam 22 and the diagonal beam 28. The monitoring system 18 (shown in FIG. 1) may then use the equations noted above to determine RA and RB, and then $P_X$ and $P_Y$. Alternatively, the monitoring system 18 may utilize other formulae to determine the forces $P_X$ and $P_Y$. The formulae noted above are merely examples.

Various other test hinge assemblies having various other shapes and sizes may be used. One or more strain gages may be secured to outer surfaces of connecting members that connect to joints that receive and retain fastening members, such as pins or bolts.

Embodiments of the present disclosure provide a strain gage assembly having one or more strain gages secured to outer surfaces of connecting members, such as beams, trusses, arms, legs, brackets, or the like. The strain gages are not inserted into internal cored or hollowed out portions of pins or bolts. Instead, the strains measured at the connecting members are used to calculate hinge pin loads (for example, forces exerted at or in pins or bolts of the assembly).

Embodiments of the present disclosure provide a test hinge assembly that is sized and shaped so that load vectors may be coincident with a center of a hinge connecting joint, for example. One or more strain gages may be secured to an outer surface of a main body of the test hinge assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

The above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A system for calculating forces exerted into an aircraft component, the system comprising:
   a test hinge assembly including:
      at least one beam, wherein the at least one beam comprises: a cross beam connected to an extension beam through a first connecting joint, and a diagonal beam connected to the extension beam through a second connecting joint and connected to the cross beam through a third connecting joint, wherein the cross beam, the extension beam, and the diagonal beam are fixedly joined together;
      at least one of the first connecting joint, the second connecting joint, and the third connecting joint having a channel configured to receive and retain a fastening member; and
      at least one strain gage secured to an outer surface of the at least one beam, wherein the at least one strain gage is configured to detect one or more strains exerted into the at least one beam; and
   a monitoring system in communication with the at least one strain gage, wherein the monitoring system is configured to calculate forces exerted into the at least one fastening member by analyzing the one or more strains exerted into the at least one beam.

2. The system of claim 1, wherein the at least one strain gage comprises:
   a first strain gage secured to the cross beam; and
   a second strain gage secured to the diagonal beam.

3. The system of claim 1, wherein the channel and the fastening member are concentric.

4. The system of claim 1, wherein the forces comprise a first pin load component force and a second pin load component force that is orthogonal to the first pin load component force, and wherein the first and second pin load component forces emanate from the a center of the fastening member.

5. The system of claim 1, wherein the test hinge assembly is configured to connect to a fixed portion and a moveable portion of the aircraft component.

6. The system of claim 1, wherein the test hinge assembly is configured to direct a first force along a first straight force line from a first center of the first connecting joint to a second center of the third connecting joint, and wherein the test hinge assembly is further configured to direct a second force along a second straight force line from a third center of the second connecting joint to the second center of the third connecting joint.

7. The system of claim 1, wherein the test hinge assembly is shaped as a right angle triangle.

8. A test hinge assembly configured to detect one or more forces exerted into an aircraft component, wherein the test hinge assembly is configured to be secured to the aircraft component, and wherein the test hinge assembly is separate and distinct from the aircraft component, the test hinge assembly comprising:

at least one beam, wherein the at least one beam comprises: a cross beam connected to an extension beam through a first connecting joint; and a diagonal beam connected to the extension beam through a second connecting joint and connected to the cross beam through a third connecting joint, wherein the cross beam, the extension beam, and the diagonal beam are fixedly joined together;

at least one of the first connecting joint, the second connecting joint, and the third connecting joint having a channel configured to receive and retain a fastening member, and configured to connect the test hinge assembly to at least a moveable portion of an aircraft component; and at least one strain gage secured to an outer surface of the at least one beam, wherein the at least one strain gage is configured to detect one or more strains exerted into the at least one beam.

9. The test hinge assembly of claim 8, wherein the at least one strain gage comprises:
a first strain gage secured to the cross beam; and
a second strain gage secured to the diagonal beam.

10. The test hinge assembly of claim 8, wherein the channel and the fastening member are concentric.

11. The test hinge assembly of claim 9, wherein the first and second connecting joints are configured to be secured to a fixed portion of the aircraft component, and the third connecting joint is configured to be secured to a hinged portion of the aircraft component.

12. The test hinge assembly of claim 8, wherein the test hinge assembly is configured to direct a first force along a first straight force line from a first center of the first connecting joint to a second center of the third connecting joint, and wherein the test hinge assembly is further configured to direct a second force along a second straight force line from a third center of the second connecting joint to the second center of the third connecting joint.

13. The test hinge assembly of claim 8, wherein the test hinge assembly is shaped as a right angle triangle.

14. A system for calculating forces exerted into an aircraft component, the system comprising:
a test hinge assembly secured to the aircraft component, wherein the test hinge assembly is separate and distinct from the aircraft component, the test hinge assembly including:
a cross beam connected to an extension beam through a first connecting joint having a first channel configured to receive and retain a first fastening member;
a diagonal beam connected to the extension beam through a second connecting joint having a second channel configured to receive and retain a second fastening member, and wherein the diagonal beam is connected to the cross beam through a third connecting joint having a third channel configured to receive and retain a third fastening member, wherein the cross beam, the extension beam, and the diagonal beam are fixedly joined together;
a first strain gage secured to an outer surface of the cross beam, wherein the first strain gage is configured to detect first strains exerted into the cross beam; and
a second strain gage secured to an outer surface of the diagonal beam, wherein the second strain gage is configured to detect second strains exerted into the diagonal beam; and
a monitoring system in communication with the first and second strain gages, wherein the monitoring system is configured to calculate forces exerted into at least one of the fastening members by analyzing the first and second strains.

15. The system of claim 14, wherein the first channel is concentric with the first fastening member, wherein the second channel is concentric with the second fastening member, and wherein the third channel is concentric with the third fastening member.

16. The system of claim 14, wherein the forces comprise a first pin load component force and a second pin load component force that is orthogonal to the first pin load component force, and wherein the first and second pin load component forces emanate from the a center of one of the fastening members.

17. The system of claim 14, wherein test hinge assembly is configured to direct a first force along a first straight force line from a first center of the first connecting joint to a second center of the third connecting joint, and wherein the test hinge assembly is further configured to direct a second force along a second straight force line from a third center of the second connecting joint to the second center of the third connecting joint.

18. The system of claim 14, wherein the test hinge assembly is shaped as a right angle triangle.

* * * * *